United States Patent
Zhang

(10) Patent No.: US 9,645,295 B2
(45) Date of Patent: May 9, 2017

(54) LIGHT GUIDE PLATE AND BACKLIGHT MODULE WITH THE SAME

(71) Applicant: Shenzhen China Star Optoelectronics Technology Co., Ltd., Shenzhen, Guangdong (CN)

(72) Inventor: Junxiao Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 187 days.

(21) Appl. No.: 14/423,107

(22) PCT Filed: Jan. 15, 2015

(86) PCT No.: PCT/CN2015/070742
§ 371 (c)(1),
(2) Date: Feb. 20, 2015

(87) PCT Pub. No.: WO2016/106854
PCT Pub. Date: Jul. 7, 2016

(65) Prior Publication Data
US 2016/0341863 A1 Nov. 24, 2016

(30) Foreign Application Priority Data
Dec. 31, 2014 (CN) .......................... 2014 1 0855741

(51) Int. Cl.
*F21V 8/00* (2006.01)
(52) U.S. Cl.
CPC .......... *G02B 6/002* (2013.01); *G02B 6/0016* (2013.01); *G02B 6/0031* (2013.01); *G02B 6/0088* (2013.01); *G02B 6/0091* (2013.01)

(58) Field of Classification Search
CPC .... G02B 6/002; G02B 6/0016; G02B 6/0031; G02B 6/0088
See application file for complete search history.

(56) References Cited

U.S. PATENT DOCUMENTS

| | | | |
|---|---|---|---|
| 7,876,393 B2 * | 1/2011 | Tanabe | G02B 6/0021 349/62 |
| 2010/0142225 A1 * | 6/2010 | Kurihara | G02B 6/0036 362/621 |
| 2010/0296021 A1 * | 11/2010 | Jung | G02B 6/0088 349/58 |
| 2016/0195668 A1 * | 7/2016 | Peng | G02B 6/0046 362/606 |

FOREIGN PATENT DOCUMENTS

CN 101460887 A 6/2009

* cited by examiner

Primary Examiner — Mary Ellen Bowman
(74) Attorney, Agent, or Firm — Andrew C. Cheng

(57) ABSTRACT

A light guide plate includes an incident edge and a plurality of V-shaped grooves. The incident edge includes a tilted surface, a vertical surface, a top surface and a bottom surface. The top surface is configured in parallel with the bottom surface. The top surface joins with an end of the tilted surface. The bottom surface joins with the other end of the tilted surface. The plurality of V-shaped grooves extend in a predetermined direction and are configured on the tilted surface. When the light from a light source strikes on a tilted surface, on which V-shaped grooves make the light diffused, and the diffused light is in conformity on the incident edge, having no hot spot there.

7 Claims, 1 Drawing Sheet

LIGHT GUIDE PLATE AND BACKLIGHT MODULE WITH THE SAME

BACKGROUND OF THE INVENTION

1. Field of the Invention

The present invention relates to a liquid crystal display (LCD) technology, more particularly, to a light guide plate (LGP) removing hot spot on a incident edge and a backlight module with the LGP.

2. Description of the Prior Art

The LCD device has such merits of thinness, lightness, power saving, and low radiation as to be applied in notebook computers, mobile phones, electronic dictionaries and other electronic display devices. As per the LCD technology having been developing, so changes the environment in which the electronic display devices are used. They are more often used outdoors. Demand on visual effects is rising, so a LCD device of greater lightness is expected.

Accordingly, it is needed to raise light utilization efficiency. Among all parts of the backlight module, the LGP plays a very significant role in raising light utilization efficiency. In current LGPs, however, Hot spot is a common phenomenon on the incident edge (or lighting bottom) on the LGP.

SUMMARY OF THE INVENTION

According to the present invention, a light guide plate (LGP) comprises an incident edge and a plurality of V-shaped grooves. The incident edge comprises a tilted surface, a vertical surface, a top surface and a bottom surface. The top surface is configured in parallel with the bottom surface. The top surface joins with an end of the tilted surface. The bottom surface joins with the other end of the tilted surface. The plurality of V-shaped grooves extend in a predetermined direction and are configured on the tilted surface.

Furthermore, a predetermined direction is parallel with the width direction of the LGP.

Furthermore, an angle between the tilted surface and the bottom surface is in a range between 10° and 80°.

Furthermore, an angle between a first side and a second side of the V-shaped groove is 90°.

Furthermore, a width direction of the second side of the V-shaped groove is in parallel with the width direction of the top surface or the LGP.

Furthermore, a plurality of concave circular grooves are configured on the bottom surface.

According to the present invention, a backlight module comprises a light guide plate (LGP) and a light source module configured correspondingly to an incident edge of the LGP. The light source module comprises a supporting frame and a light source. The supporting frame comprises a tilted face configured in parallel with a tilted surface. The light source is configured on the tilted face. The LGP comprises an incident edge and a plurality of V-shaped grooves. The incident edge comprises a tilted surface, a vertical surface, a top surface and a bottom surface. The top surface is configured in parallel with the bottom surface. The top surface joins with an end of the tilted surface. The bottom surface joins with the other end of the tilted surface. The plurality of V-shaped grooves extend in a predetermined direction and are configured on the tilted surface.

Furthermore, the supporting frame further comprises a top face and a vertical face, the top face is on the same plane as the top surface, the top face joins with an end of the tilted face, the vertical face is configured in parallel with the vertical surface, the vertical face joins with the other end of the tilted face.

Furthermore, the light source module further comprises a reflector configured on the vertical face.

Furthermore, the light source module further comprises a light-shielding unit, the light-shielding unit is configured at the connection of the top face and the tilted face, and the top of the light-shielding unit is on the same plane with the top face.

Furthermore, a predetermined direction is parallel with the width direction of the LGP.

Furthermore, an angle between the tilted surface and the bottom surface is in a range between 10° and 80°.

Furthermore, an angle between a first side and a second side of the V-shaped groove is 90°.

Furthermore, a width direction of the second side of the V-shaped groove is in parallel with the width direction of the top surface or the LGP.

Furthermore, a plurality of concave circular grooves are configured on the bottom surface.

The object of the present invention is to provide a LGP and a backlight module with the LDP. When the light from a light source strikes on a tilted surface, on which V-shaped grooves make the light diffused, and the diffused light is in conformity on the incident edge, having no hot spot there.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1:
FIG. 1 depicts a schematic diagram of a LCD device according to a preferred embodiment of the present invention.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

FIG. 1 depicts a schematic diagram of a LCD device according to a preferred embodiment of the present invention.

Referring to FIG. 1, the LCD device according to the embodiment comprises a liquid crystal panel 200 and a backlight module 100 corresponding to the liquid crystal panel 200. The backlight module 100 provides a display light source to the liquid crystal panel 200 so as to make the liquid crystal panel 200 display images.

The liquid crystal panel 200 comprises a thin film transistor (TFT) array substrate 210, a color filter (CF) substrate 220 facing the TFT array substrate, and a liquid crystal layer 230 between the TFT array substrate 210 and the CF substrate 220. The liquid crystal layer 230 comprises liquid crystal molecules. Due to the specific structure of the liquid crystal panel 200 according to the embodiment being fundamentally the same as the liquid crystal panel according to the prior art, here comes no detailed description about it.

The following is detailed description of the specific structure of the backlight module 100 according to the embodiment of the present invention.

Figure 2:
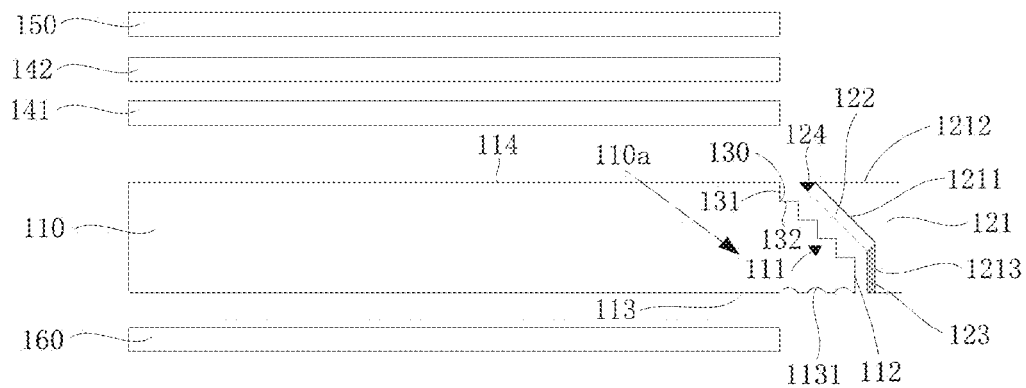
FIG. 2 depicts a lateral view of the backlight module according to the embodiment of the present invention.

FIG. 2 depicts a lateral view of the backlight module 100 according to the embodiment of the present invention.

Referring to FIG. 2, the backlight module 100 according to the embodiment comprises: a light guide plate (LGP) 110, a light source module 120, a plurality of V-shaped grooves 130, a first brightness enhancement film (BEF) 141, a second BEF 142, a diffuser film 150, and a reflector sheet 160. To be noted, the backlight module 100 further comprises other necessary optical components.

In particular, the LGP 110 comprises an incident edge 110a, which comprises a tilted surface 111, a vertical surface 112, a bottom surface 113 and a top surface 114. The bottom surface 113 indicates the bottom surface of the LGP 110, and the top surface 114 indicates the top surface of the LGP 110. The top surface 114 is parallel with the bottom surface 113. The top surface 114 joins with an end of the tilted surface 110, the other end of the tilted surface 110 joins with an end of the vertical surface 112, and the other end of the vertical surface 112 joins with the bottom surface 113. The plurality of V-shaped groove 130 extending in predetermined direction is configured on the tilted surface 111.

The light source module 120 is configured correspondingly near the incident edge 110a. Specifically, the light source module 120 comprises a supporting frame 121 and a light source 122. The supporting frame 121 comprises a tilted face 1211, configured in parallel with the tilted surface 111 of the incident edge 110a. The light source 122 is fixed on the tilted face 1211. Preferably, the preferred light source 122 is a light emitting diode (LED).

When the light from the light source 122 strikes on the tilted surface 111, where the V-shaped groove 130 makes the light diffused, and the diffused light is in conformity on the incident edge, thereby avoiding occurrence of hot spot on the incident edge 110a.

The first BEF 141, the second BEF 142, and the diffuser film 150 are configured sequentially onto the top surface 114 of the LGP 110. The first BEF 141 and the second BEF 142, by conjoining the light emitted from the top surface 114, enhancing the brightness of the light from the top surface 114. The diffuser film 150 is configured to provide even plane light source for the liquid crystal panel 200, by enhancing the upward brightness of the light heightened by the BEFs and making the same light more even and softened. The reflector sheet 160, under the bottom surface 113 of the LGP 110, is configured to raise light utilization efficiency of the LGP 110 by reflecting the light out of the bottom surface 113 of the LGP 110 back to the LGP 110.

According to the preferred embodiment, the predetermined direction where the V-shaped groove 130 extends is parallel with the width direction of the LGP 110. Moreover, the angle between the tilted surface 111 and the bottom surface 113 can be set between 10° and 80° according to the manufacture's need.

Moreover, the V-shaped groove 130 comprises a first side 131 and a second side 132, joining on a predetermined angle. Preferably, the predetermined angle is 90°. According to the embodiment, the width direction of the second side 132 is in parallel with the width direction of the LGP 110, that is, the first side 131 is perpendicular to the bottom surface 113 or the top surface 114.

Because the bottom surface 113 of the incident edge 110a is opposite to the tilted face 111, the light from the light source 122, passing through the tilted surface 111, strikes directly on the bottom surface 113 of the incident edge 110a, which makes it too bright on the bottom surface 113 of the incident edge 110a. It is therefore needed to disseminate a plurality of mesh points 1131 over the bottom surface 113 of the incident edge 110a, to reduce the brightness there. Preferably, the plurality of mesh points is concave circular groove.

Moreover, the supporting frame 121 comprises a top face 1212 and a vertical face 1213, where the top face 1212 is on the same plane with the top surface 114, the top face 1212 joins with an end of the tilted face 1211, the vertical face 1213 is configured in parallel with and opposite to the vertical surface 112 and the vertical face 1213 joins with the other end of the tilted face 1211.

To increase the light utilization efficiency by reflecting the light emitted from the vertical surface 112 back to the LGP 110, the light source module 120 further comprises a reflector 123. The reflector 123 is configured on the vertical face 1213 so as to correspond to the vertical surface 112. According to the embodiment, the reflector 123 can be a reflector film made of aluminum or other suitable reflectors.

To prevent the light from the light source 122 from leaking upward, the light source module 120 further comprises a light-shielding unit 124, wherein the light-shielding unit 124 is configured at the connection of the top face 1212 and the tilted face 1211. The top of the light-shielding unit 124 is on the same plane with the top face 1212. According to the embodiment, the light-shielding unit 124 can be a black shading tape with a triangular cross section, but not limited to it according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising a light guide plate (LGP) and a light source module configured correspondingly to an incident edge of the LGP, the light source module comprising a supporting frame and a light source, the supporting frame comprising a tilted face, the tilted face configured in parallel with a tilted surface, the light source configured on the tilted face, wherein the LGP comprises:

the incident edge, comprising the tilted surface, a vertical surface, a top surface and a bottom surface, the top surface configured in parallel with the bottom surface, the top surface joining with an end of the tilted surface, the bottom surface joining with the other end of the tilted surface; and a plurality of V-shaped grooves, extending in a predetermined direction and configured on the tilted surface;

wherein the supporting frame further comprises a top face and a vertical face, the top face is on the same plane as the top surface, the top face joins with an end of the tilted face, the vertical face is configured in parallel with and opposite to the vertical surface, the vertical face joins with the other end of the tilted face, the light source module further comprises a reflector and a light-shielding unit, the reflector is configured on the vertical face so as to correspond to the vertical surface, the light-shielding unit is configured at the connection of the top face and the tilted face, and the top of the light-shielding unit is on the same plane with the top face.

2. The backlight module of claim 1, wherein the predetermined direction is in parallel with a width direction of the LGP.

3. The backlight module of claim 1, wherein an angle between the tilted surface and the bottom surface is in a range between 10° and 80°.

4. The backlight module of claim 1, wherein an angle between a first side and a second side of the V-shaped groove is 90°.

5. The backlight module of claim 1, wherein a width direction of a second side of the V-shaped groove is in parallel with a width direction of the top surface or the LGP.

6. The backlight module of claim 4, wherein a width direction of the second side of the V-shaped groove is in parallel with a width direction of the top surface or the LGP.

7. The backlight module of claim 1, wherein a plurality of concave circular grooves are configured on the bottom surface.

\* \* \* \* \*